United States Patent
Muratore et al.

(10) Patent No.: US 8,948,163 B2
(45) Date of Patent: Feb. 3, 2015

(54) METHOD FOR MANAGING VOICE CALLS DURING PACKET-SWITCHED SESSIONS, AND MOBILE COMMUNICATIONS NETWORK IMPLEMENTING THE METHOD

(75) Inventors: Giuliano Muratore, Rome (IT); Alberto Zaccagnini, Rome (IT)

(73) Assignee: Telecom Italia S.p.A., Milan (IT)

( * ) Notice: Subject to any disclaimer, the term of this patent is extended or adjusted under 35 U.S.C. 154(b) by 1577 days.

(21) Appl. No.: 11/992,887

(22) PCT Filed: Sep. 30, 2005

(86) PCT No.: PCT/IT2005/000565
§ 371 (c)(1),
(2), (4) Date: Sep. 23, 2009

(87) PCT Pub. No.: WO2007/036962
PCT Pub. Date: Apr. 5, 2007

(65) Prior Publication Data
US 2010/0020744 A1 Jan. 28, 2010

(51) Int. Cl.
| | |
|---|---|
| *H04L 12/66* | (2006.01) |
| *H04W 4/00* | (2009.01) |
| *H04W 76/02* | (2009.01) |
| *H04W 76/06* | (2009.01) |
| *H04W 76/04* | (2009.01) |
| *H04W 88/06* | (2009.01) |
| *H04W 88/14* | (2009.01) |
| *H04W 92/02* | (2009.01) |
| *H04W 92/24* | (2009.01) |

(52) U.S. Cl.
CPC ............ *H04W 76/02* (2013.01); *H04W 76/064* (2013.01); *H04W 76/04* (2013.01); *H04W 76/06* (2013.01); *H04W 88/06* (2013.01); *H04W 88/14* (2013.01); *H04W 92/02* (2013.01); *H04W 92/24* (2013.01)
USPC ............ 370/353; 370/328; 370/330; 370/352

(58) Field of Classification Search
CPC ....... H04L 12/66; H04M 11/10; H04W 76/02
USPC .................................. 370/328, 330, 352, 353
See application file for complete search history.

(56) References Cited

U.S. PATENT DOCUMENTS

| | | | | |
|---|---|---|---|---|
| 5,745,695 A | * | 4/1998 | Gilchrist et al. | 709/227 |
| 2004/0092252 A1 | * | 5/2004 | Gustavsson et al. | 455/412.2 |
| 2005/0041640 A1 | * | 2/2005 | Nasielski et al. | 370/352 |
| 2005/0201362 A1 | * | 9/2005 | Klein et al. | 370/352 |

* cited by examiner

Primary Examiner — Noel Beharry
Assistant Examiner — Farhad Ali
(74) Attorney, Agent, or Firm — Finnegan, Henderson, Farabow, Garrett & Dunner, L.L.P.

(57) ABSTRACT

A method of managing circuit-switched calls in a mobile communications network supporting packet-switched sessions is performed as follows: upon reception by the mobile communications network of a circuit-switched call for a user of the mobile communication network, the network ascertains whether the user is engaged in a packet-switched session. In the affirmative case, the network closes the packet-switched data exchange session prior to attempting to route the call to the user.

16 Claims, 8 Drawing Sheets

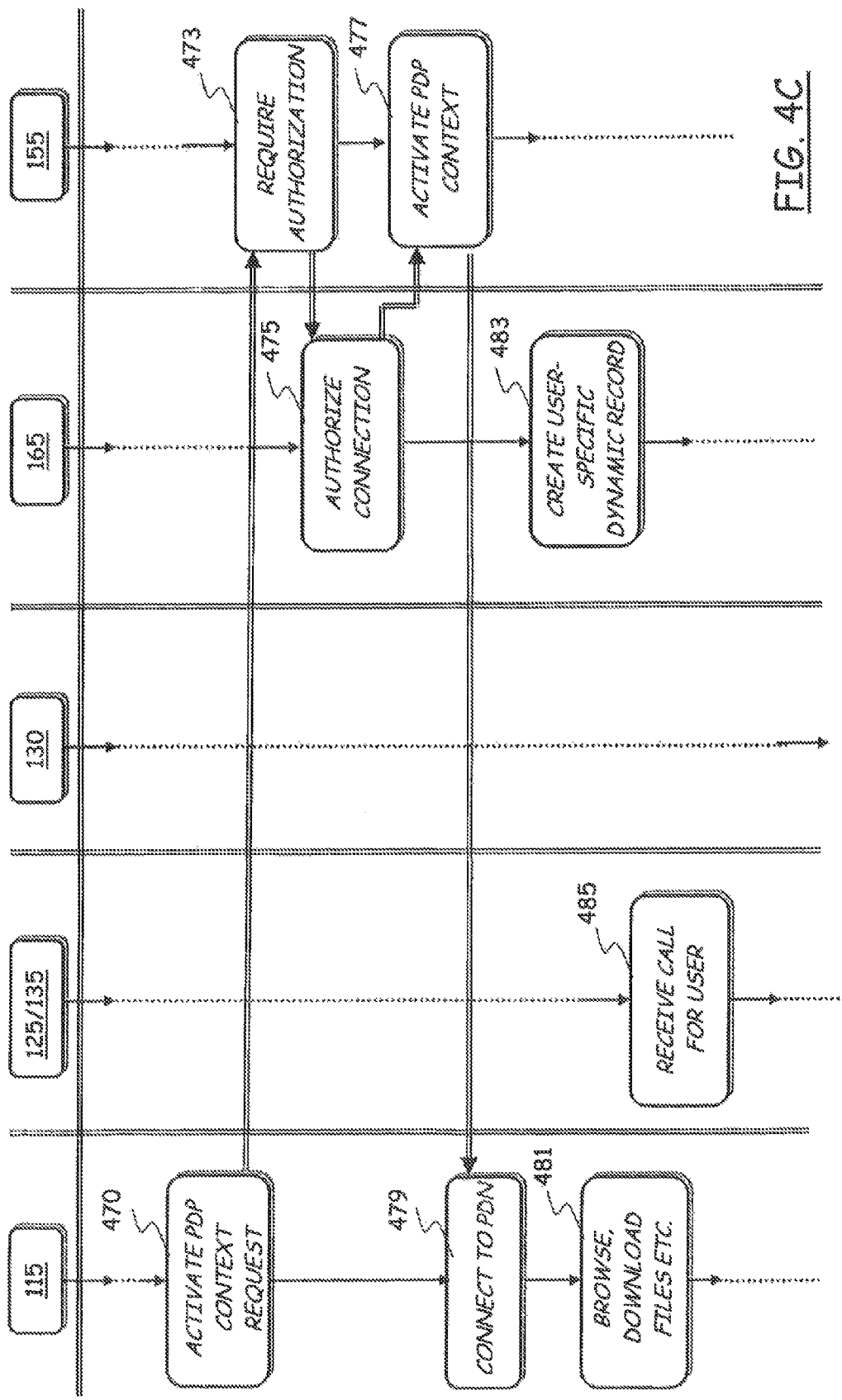

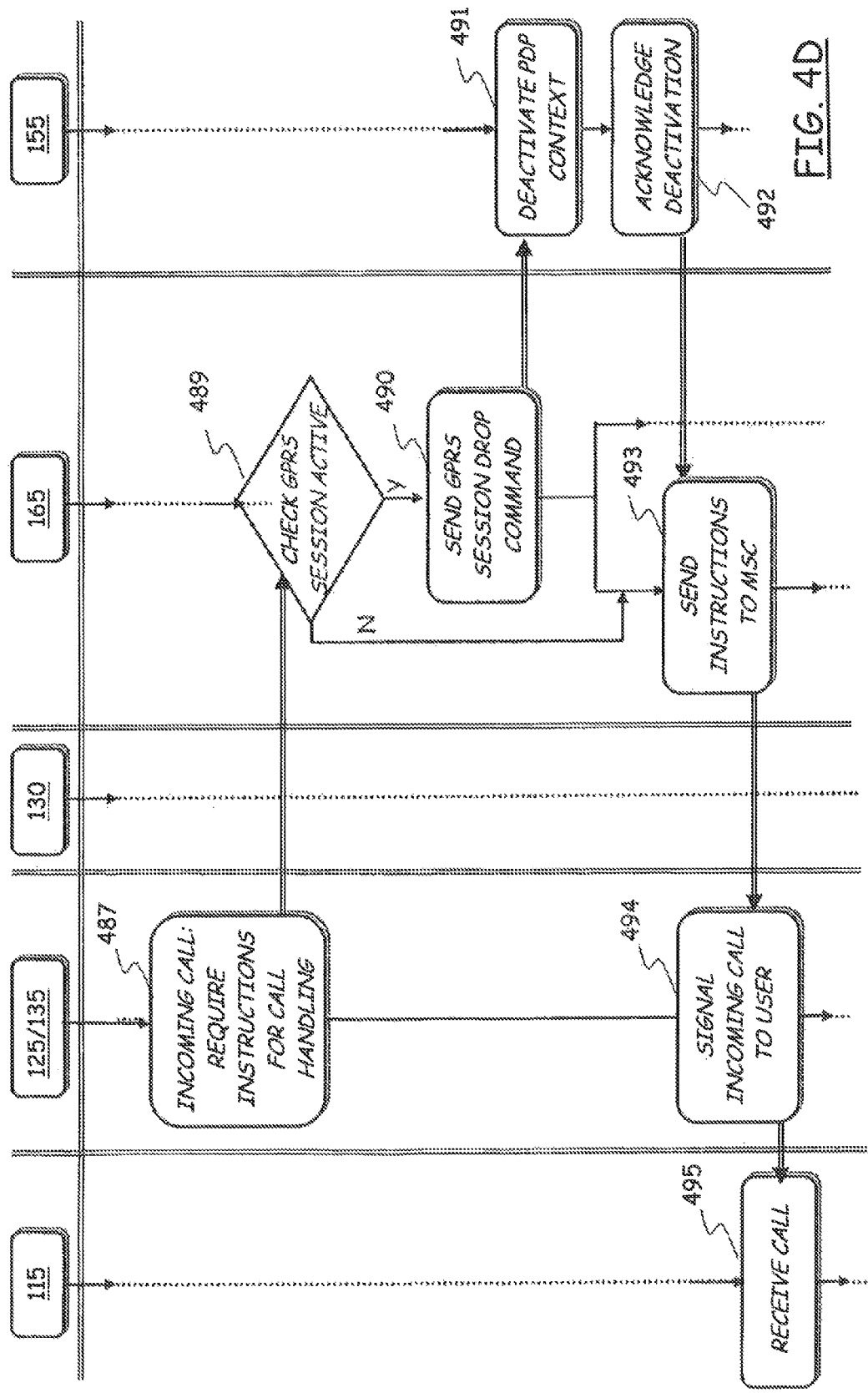

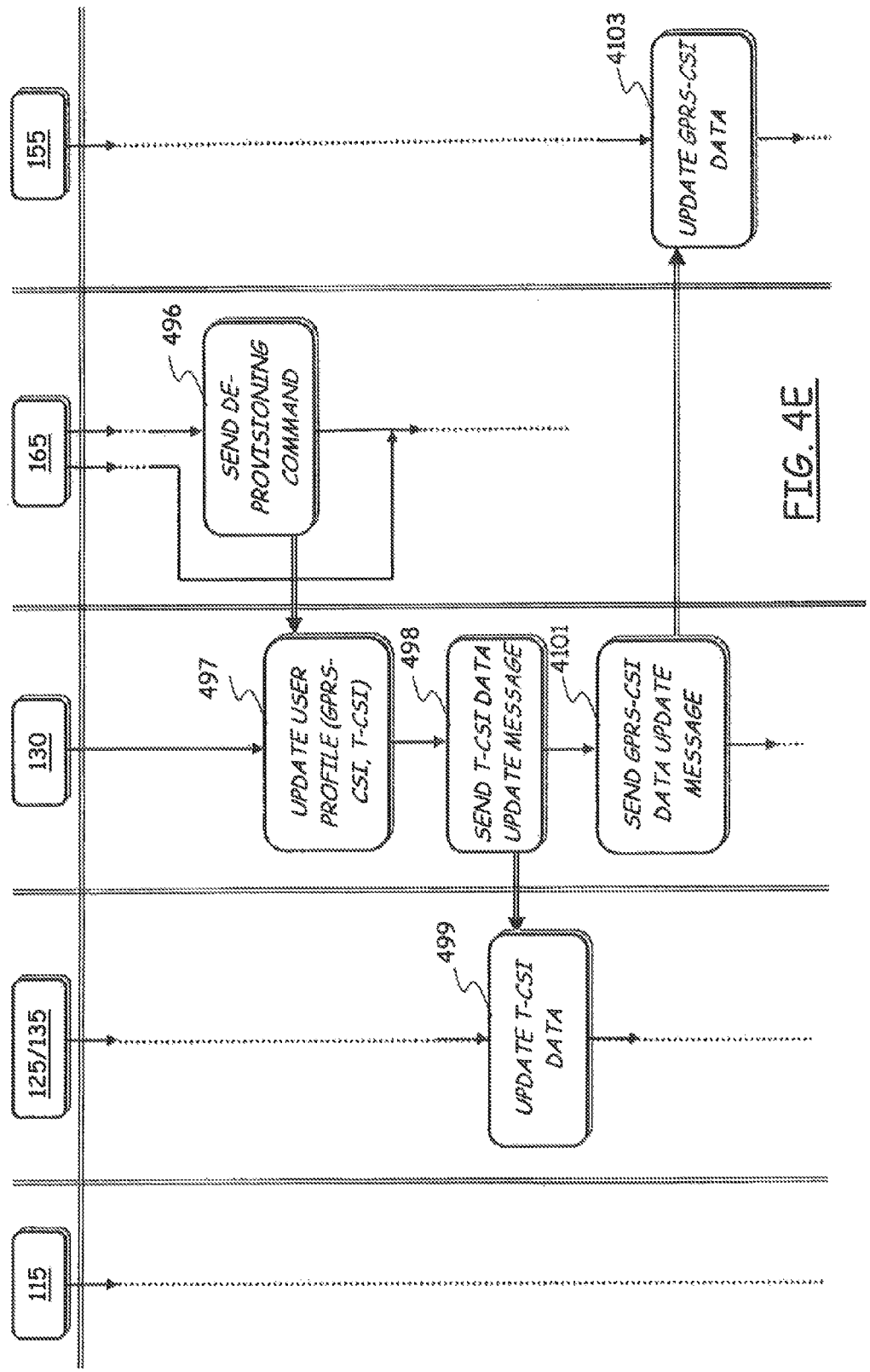

METHOD FOR MANAGING VOICE CALLS DURING PACKET-SWITCHED SESSIONS, AND MOBILE COMMUNICATIONS NETWORK IMPLEMENTING THE METHOD

CROSS REFERENCE TO RELATED APPLICATION

This application is a national phase application based on PCT/IT2005/000565, filed Sep. 30, 2005, the content of which is incorporated herein by reference.

FIELD OF THE INVENTION

The present invention generally relates to the field of mobile communications and of mobile communications networks, particularly mobile telephony networks, such as for example second-generation networks like those complying with the GSM (Global System for Mobile Communications) standard. Even more particularly, the invention relates to mobile telephony network having a packet-switched communications infrastructure, like a GPRS (General Packet Radio Service) or EDGE (Enhanced Data rate for GPRS Evolution).

DESCRIPTION OF RELATED ART

Mobile telephony networks, initially conceived for enabling voice communications, similarly to the wired, Public Switched Telephone Networks (PSTNs), but between mobile users, have experienced an enormous spread, especially after the introduction of second-generation mobile cellular networks, and particularly digital mobile cellular networks such as those complying with the GSM standard (and its United States and Japanese counterparts).

However, these second-generation cellular networks, albeit satisfactory for voice communication, offer very poor data exchange capabilities.

Similarly to the plain old PSTNs, second-generation cellular networks are in fact circuit-switched networks; this greatly limits the bandwidth that can be allocated for a given user. On the contrary, data communications networks such as computer networks and, among them, the Internet, adopt packet switching schemes, which allow much higher data transfer rates.

Some solutions have been proposed to overcome the limitations of conventional, circuit-switched cellular networks such as the GSM networks, so as to enable users of mobile terminals efficiently exploiting services offered through the Internet.

One of the solutions that have acquired a significant popularity is the GPRS, a digital mobile telephony technology compatible with GSM networks (actually, built on the existing GSM network architecture) and that enables data transfer at a speed higher than that allowed by pure GSM.

Essentially, the GPRS can be viewed as a GSM add-on that supports and enables packet-based data communication.

Without entering into excessive details, known per-se in the art and not relevant to the understanding of the invention embodiment herein described, the GPRS architecture is mainly based on two types of network apparatuses, called the Gateway GPRS Support Node (GGSN) and the Serving GPRS Support Nodes (SGSN). The GGSN acts as an interface between the mobile telephony network and an external packet-switched data network (shortly, packet data network), such as the Internet or a private intranet; the GGSN exchanges data with the SGSN, which is associated with one or more respective base station controllers, being also part of the circuit-switched mobile telephony network, and routes the data packets received, through the GGSN, from the external packet data network, to the proper destination users' mobile communications terminals (GPRS-supporting mobile phones), located in a geographic area of competence of that SGSN.

The procedure for enabling the user of a generic GPRS mobile communications terminal to exploit services provided by a service provider or content provider accessible for example through the Internet essentially involves two steps: a first step (called Packet Data Protocol—PDP—context activation) in which a logic connection (the PDP context) is created between the mobile terminal and the GGSN; and a second step in which the mobile telephony network assigns to the mobile terminal prescribed physical communication resources, namely radio resources for transmission on the "over the air" radio link portion of the cellular network.

A problem with the current implementations of the GPRS is that the mobile communications terminals are unable to receive a normal, voice (circuit-switched) call when exchanging data packets, for example when a transfer of data packets is ongoing towards to the mobile terminal (by way of example, the mobile terminal may be receiving an e-mail message from a mail server, or it may be downloading a file from a file server, or a WAP—Wireless Application Protocol—or Web page): in these conditions, the mobile terminal cannot be notified of the incoming voice call, since the mobile telephony network cannot perform the paging.

This is essentially due to the fact that the radio channels used by the network for the paging are virtually the same as those used for the data packets traffic: the logic channels used for the paging and for the data traffic exploit the same physical channels.

In a class of mobile terminals (so-called "class B" terminals), this problem only occurs when the mobile terminal is actively engaged in a transfer of data (i.e., when the mobile terminal is in the so-called "packet transfer mode"), not when the terminal is in the so-called "idle mode", in which, despite a PDP context has been activated, the mobile communications terminal is not receiving/sending data packets: in this latter case, the mobile terminal can receive the paging by the network, and, if the user so decides, the mobile terminal suspends the GPRS session (keeping the PDP context active), allows answering the voice call, and then resumes the GPRS session after the call is terminated, the data transfer restarting from where it was interrupted. In another class of mobile terminals (so-called "class C" terminals), the mobile terminal is instead unable to receive the call even if in idle mode.

SUMMARY OF THE INVENTION

The Applicant has observed that the problem outlined above may be really annoying for the users. For example, the users might wish to have the possibility of receiving and answering urgent voice calls even if they are engaged in a GPRS session.

The Applicant has thus tackled the problem of allowing receiving of voice calls to mobile terminals engaged in a data packet transfer.

The Applicant has found that a solution to the above problem may be found by providing a suitable call management network functionality adapted to manage circuit-switched (voice) calls in case of packet-switched data transfer sessions, and properly configuring the circuit-switched calls switching centers and the SGSNs of the network is such a way to interact with that network functionality, whereby when a circuit-switched (voice) call is received directed to a mobile communications terminal, the competent switching center invokes the call management network functionality, which, after having ascertained that the mobile terminal is engaged in a packet-switched data transfer session, instructs the competent SGSN to release the packet-switched session, and afterwards the call management network functionality instructs the switching center to proceed with the usual management of the call.

In particular, the Applicant has found that the provisions of the already-available standard referred to as Customized Application for Mobile network Enhanced Logic (CAMEL), recently been prepared and currently being implemented in mobile telecommunication networks, in order to facilitate the management of intelligent network services in cases of roaming, can be expediently exploited for implementing the call management function referred to above.

According to the first aspect of the present invention, a method of managing circuit-switched calls is proposed.

The method comprises:

upon reception by the mobile communications system of a circuit-switched call for a user of the mobile communications system, ascertaining whether the user is engaged in a packet-switched session; and in the affirmative case, at least temporarily releasing the packet-switched session prior to attempting to route the circuit-switched call to the user.

According to a second aspect of the invention, an apparatus for use in a mobile communications network is provided. The apparatus comprises at least a first module adapted to:

upon reception by the mobile communications network of an incoming circuit-switched call for a user of the mobile communications system, ascertaining whether the user is engaged in a packet-switched session;

in the affirmative case, sending a first command for at least temporarily releasing the packet-switched session prior to allowing attempting to route the circuit-switched call to the user.

According to a third aspect, the invention relates to a mobile communications network comprising a network apparatus according to the second aspect.

The solution according to the present invention has a very limited impact on the architecture and apparatuses of an existing mobile communications network, because it may implemented in terms of a relatively simple application software that can readily be integrated in existing network functionalities.

BRIEF DESCRIPTION OF THE DRAWINGS

The features and advantages of the present invention will be made clear by the following detailed description of an embodiment thereof, provided merely by way of exemplary and non-limitative example, description that will be conducted making reference to the attached drawings, wherein:

FIGS. 4A-4E are simplified, schematic flowcharts illustrating the main steps of a method according to an embodiment of the present invention;

DETAILED DESCRIPTION OF THE PREFERRED EMBODIMENT

Figure 1:
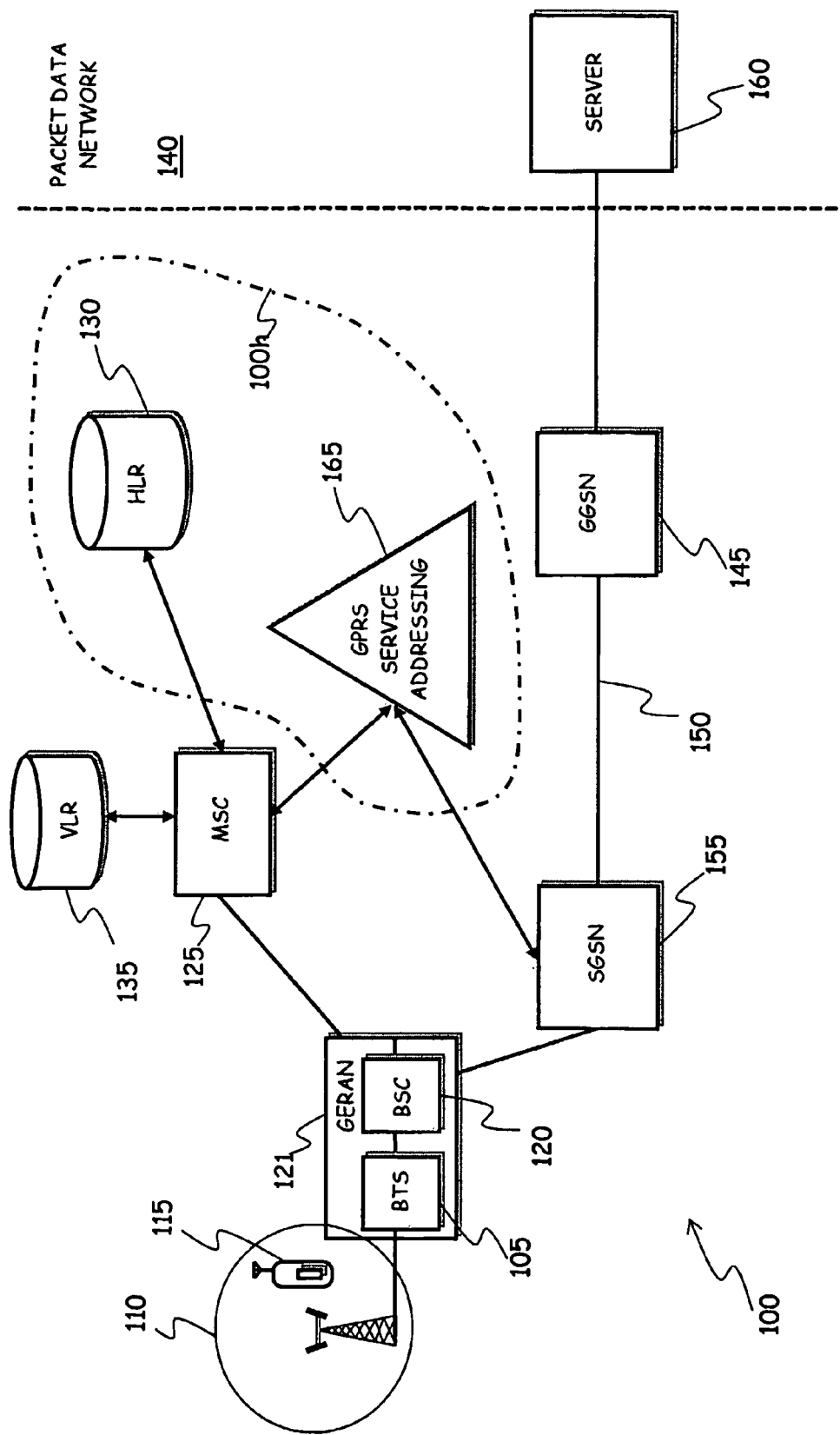
FIG. 1 schematically shows the architecture of a mobile telephony network according to an embodiment of the present invention.

Referring to the drawings, FIG. 1 shows, schematically and limitedly to the elements essential for the understanding of the invention embodiment being described, the architecture of a mobile telephony network 100, according to an embodiment of the present invention.

In particular, the mobile telephony network may be a second-generation cellular network, like a GSM network (or a network complying to corresponding standards in different areas of the world).

In a way per-se known in the art, the mobile telephony network 100 includes (in the exemplary case of a GSM network) a plurality of Base Station Subsystems (BSSs), such as the BSS 121 shown in FIG. 1, each one providing coverage for mobile communications in a respective geographic region.

The generic BSS comprises a plurality of Base Transceiver Stations (BTSs), like the exemplary BTS 105 shown in FIG. 1; each BTS covers a respective area, typically referred to as a "cell", within the region covered by the BSS; in the drawing, the cell covered by the BTS 105 is schematically depicted as an encircled area denoted as 110.

The generic BTS communicates with, i.e., handles the transmission/reception of radio signals to/from the mobile communications terminals which are located in the BTS's cell; for example, the BTS 105 communicates with a mobile communications terminal 115, located in the cell 110.

Typically, several BTSs are connected to and controlled by a same Base Station Controller (BSC), like the BSC 120 shown in the drawing; the BSC is a network unit that, roughly speaking, instructs the controlled BTSs about the information to be transmitted to/received from the mobile communications terminals on specified physical and/or logical radio communication channels. The BTSs and the BSCs form the so-called Radio Access Network (RAN).

Groups of different BSSs are connected to respective Mobile Switching Centers (MSCs), like the MSC 125; the generic MSC performs the function of switching to other MSCs of the same mobile communications network (a generic mobile telephony network may include several MSCs, distributed across the territory), and/or to the MSCs of other mobile communications networks, of different network operators (for example, to allow users subscribers of the network 100 to roam in the other mobile communications networks), and/or to the exchanges of one or more wired, Public Switched Telephone Networks (PSTNs).

The generic MSC interacts with a network's Home Location Register (HLR), and with a local Visitor Location Register (VLR). The HLR contains subscription data of users that are subscriber of that mobile communications network, particularly mobile phone numbers, users' profiles, and the like. The VLR contains instead information about the users (either subscribers of that mobile communications network, or subscribers of other mobile communications network) who, at a current time, are registered to the mobile telephony network and are located in the geographic area controlled by the respective MSC. Based on the information stored in the HLR and VLR, the generic MSC is capable of switching, i.e., properly routing calls from callers to called users.

It is pointed out that, in the present description, the mobile communications network 100 may represent either the "home" network of the user of the mobile communications terminal 115 (i.e. the mobile telephony network to which the user of the mobile communication terminal 115 has subscribed, and which has issued to the user a Subscriber Identification Module (SIM), associated to the mobile communication terminal 115), or the network 100 may be assumed to represent a "visited" network, in which the user of the mobile terminal 115 is currently roaming, and is currently registered.

The HLR 130 shown in the drawing is assumed to be the HLR of the home network of the user of the mobile terminal 115, whereas the VLR 135 shown in the drawing is assumed to be the VLR associated with the MSC 125 in whose area of competence the mobile terminal 115 is currently registered. Thus, if the mobile communications network 100 is the home network of the user of the mobile terminal 115, the HLR 130 is the HLR of the network 100, and the VLR 135 is one of the VLRs of the home network; if instead the mobile communications network 100 is not the home network of the user of the mobile terminal 115, being instead a visited network in which the user of the mobile terminal 115 is roaming, the VLR 135 is one of the VLRs of the visited network, namely the one in which area the mobile terminal 115 is currently registered, whereas the HLR 130 is not the HLR of the visited network 100, but of a different network (schematized by the drawing sheet area encircled in the dash-and-dot line denoted as 100h) being the home network of the user (the visited network 100 will in this case have an own HLR, not shown because not relevant for the purposes of the present description).

The mobile communications network 100 further includes, in addition to the circuit-switched network infrastructure, a packet-switched network infrastructure, e.g., a GPRS or an EDGE infrastructure, for allowing mobile users accessing packet-based communications services.

FIG. 1 schematically depicts network elements that, according to the GPRS standard, enable the mobile terminals connected to the mobile communications network 100 to access an external packet-based data communications network (shortly, a packet data network) such as, for example, the Internet and/or an Intranet, more generally any data communications network in which data are exchanged in packets, i.e. according to a packet-switched scheme instead of a circuit-switched one, particularly but not limitatively any network adopting the Internet Protocol (IP). In the drawing, the external packet data network is shown only schematically, and it is identified globally by reference numeral 140; hereinafter, it will be assumed that the external packet data network 140 is the Internet, but this is not to be intended as a limitation, being merely an example.

Without entering into excessive details, known per-se in the art and not relevant to the understanding of the invention embodiment herein described, at least one Gateway GPRS Support Node (GGSN) 145 is provided to act as an interface between the mobile communications network 100 and the external packet data network 140. The GGSN 145 exchanges data, through a GPRS backbone network 150, with one or more Serving GPRS Support Nodes (SGSN), such as the SGSN 155 shown in the drawing. The generic SGSN is associated with one or more respective BSSs, and routes the data received, through the GGSN (or one of the GGSNs, if more than one GGSN exist) and the GPRS backbone network, from the external packet-based communications network (or one of the external, packet-based communications networks), to the proper destination mobile terminals, located in the geographic area covered by the respective BSS (or by one of the respective BSSs); for example, the SGSN 155 routes the data received, through the GGSN 145 and the GPRS backbone network 150, from the external packet-based communications network 140 to the mobile terminal 115.

In particular, the generic SGSN keeps track of the geographical location of the mobile communications terminals, so as to know where the data are to be routed in order to be delivered to the intended destination mobile terminal.

Conventionally, the procedure for enabling the user of a generic mobile terminal supporting GPRS communications (a GPRS mobile terminal), for example the terminal 115, to exploit services provided by a service provider or content provider 160 (the server) accessible through the packet data network 140 essentially involves two steps: a first step (called Packet Data Protocol—PDP—context activation) in which a network address (typically an IP address) is assigned to the mobile terminal 115 and a logic connection (the PDP context) is created between the GPRS mobile terminal 115 and the GGSN 155; and a second step (called Temporary Block Flow—TBF—activation/release) in which the network 100 assigns to the GPRS mobile terminal 115 prescribed physical communication resources, namely radio resources for transmission on the "over the air" radio link portion of the network 100.

In particular, without entering into excessive details well known to those skilled in the art, the GPRS mobile terminal, after having registered at the SGSN serving the cell in which the GPRS mobile terminal is located at that moment, sends to the SGSN/GGSN a request for activation of a PDP context. The PDP context request triggers a PDP context activation procedure in which the GPRS mobile terminal, the SGSN and the GGSN exchange information useful to negotiate PDP context parameters. The PDP context activation procedure results in the definition of a data transfer path between the GGSN and the BTS that covers the cell in which the GPRS mobile terminal is located. A PDP context is thus created.

The activation of the PDP context does not involve per-se the allocation of physical communication resources of the network 100, but merely establishes a logic connection between the GPRS mobile terminal and the server; thus, the PDP context, once activated, may be kept active for hours, in principle forever, even when there are no data to be exchanged between the server and the GPRS mobile terminal, until the latter, or, possibly, the server, deactivates it.

After the PDP context has been activated, the BSC checks whether there are data received from the GGSN/SGSN to be transmitted to the GPRS mobile terminal; in the affirmative case, a Temporary Block Flow (TBF) is activated by the BSC. The activation of the TBF determines the allocation of physical radio communications resources of the network 100, i.e. of a radio channel (an airlink channel), to the mobile terminal for enabling the exchange of the data packets from the data transfer path through the proper BSC and BTS.

When the data packets have been exchanged, the TBF is deactivated and the radio resources are released; provided the PDP context is not closed, the BSC waits for new data to be exchanged. Thus, differently from the PDP context, the TBF, i.e. the physical, radio communications resources of the GSM network 100 are kept allocated for the mobile terminal only as long as there are data to be transmitted/received to/from it, and are released as soon as the data have been exchanged, keeping the radio resources free for other uses/users. In other words, a TBF is temporary and is maintained only for the duration of the data transfer.

As mentioned in the background part of the present description, a problem with the current implementations of the GPRS is that the GPRS mobile terminals are not capable of receiving a voice (circuit-switched) call when a PDP context has been activated, or at least when a transfer of data packets is ongoing (for example, while the mobile terminal is receiving an e-mail message from a mail server, or it is downloading a file from a file server, or a WAP—Wireless Application Protocol—or Web page), being impossible for the network to perform the paging necessary to notify the mobile terminal that there is an incoming call directed thereto.

This is due to the fact that the logic channels used by the network for the paging are the same as those used for the data packets traffic.

In particular, in class B terminals this problem only occurs when the mobile terminal is actively engaged in a transfer of data (the mobile terminal is in the so-called "packet transfer mode"), and not when the terminal is in the so-called "idle mode", in which, despite a PDP context is active, the terminal is not receiving/sending data packets: in this latter case, the mobile terminal can receive the paging by the network, and, if the user so decides, suspends the GPRS session, allows answering the voice call, and then resumes the GPRS session after the call is terminated. Class C terminals are instead unable to receive a call even if they are in idle mode.

According to an embodiment of the present invention, in order to overcome this problem, a call management function, hereinafter referred to as a GPRS Service Addressing (shortly, GSA) function is implemented in the network 100, for example by means of a GSA network node 165. The function performed by the GSA network node 165 is one of managing circuit-switched (voice) calls and packet-switched data transfers. It is pointed out that the GSA function may be co-located in an already existing network node, in which case the GSA node 165 is not a distinct network node.

In particular, according to an embodiment of the present invention, the GSA node 165 relies on the functionalities provided for by the CAMEL standard (particularly, by the so-called "phase 3"—"ph3"—of the CAMEL standard).

The GSA network node 165 is in particular assumed to be provided in the home network of the user of the mobile terminal 115, i.e., in the network 100 or, in case the network 100 is assumed to be a visited network, in the network 100*h*. Thanks to the exploitation of the CAMEL standard, the call management function can be offered both when the user is registered at the home network, and when the user is roaming in another network.

Figure 2:
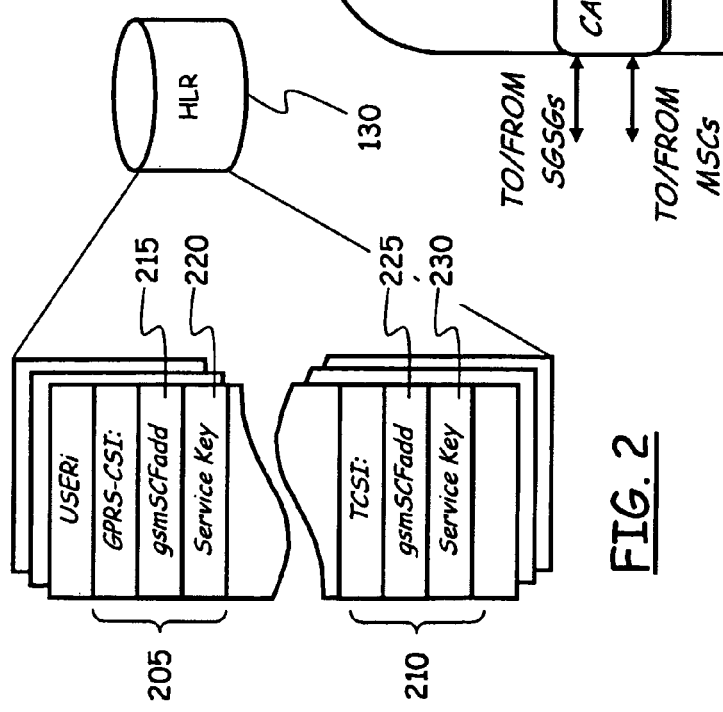
FIG. 2 is a schematic representation of (a part of) a generic user profile in a Home Location Register (HLR) of a mobile telephony network, in an embodiment of the present invention.
Figure 4A:
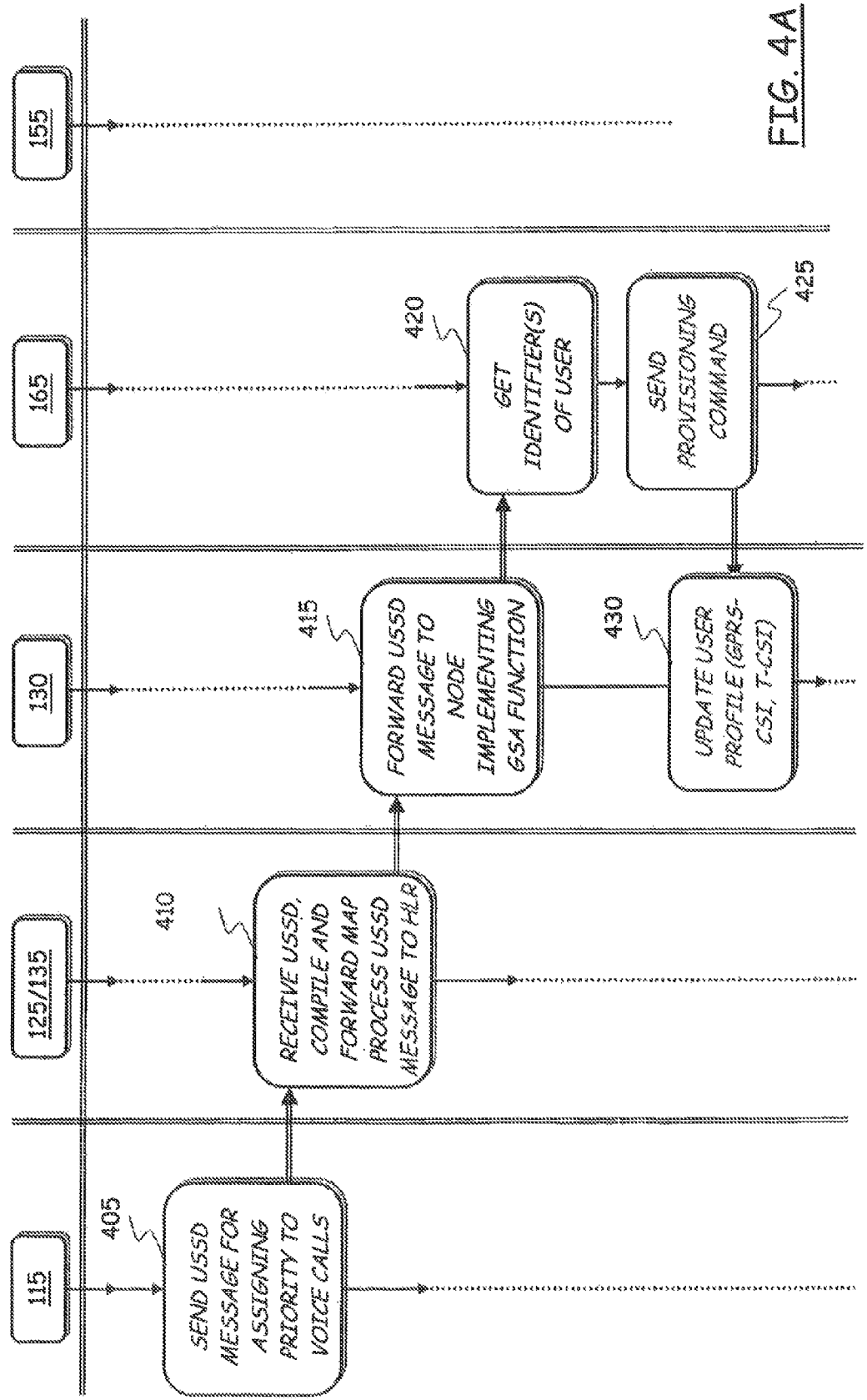
Figure 4B:
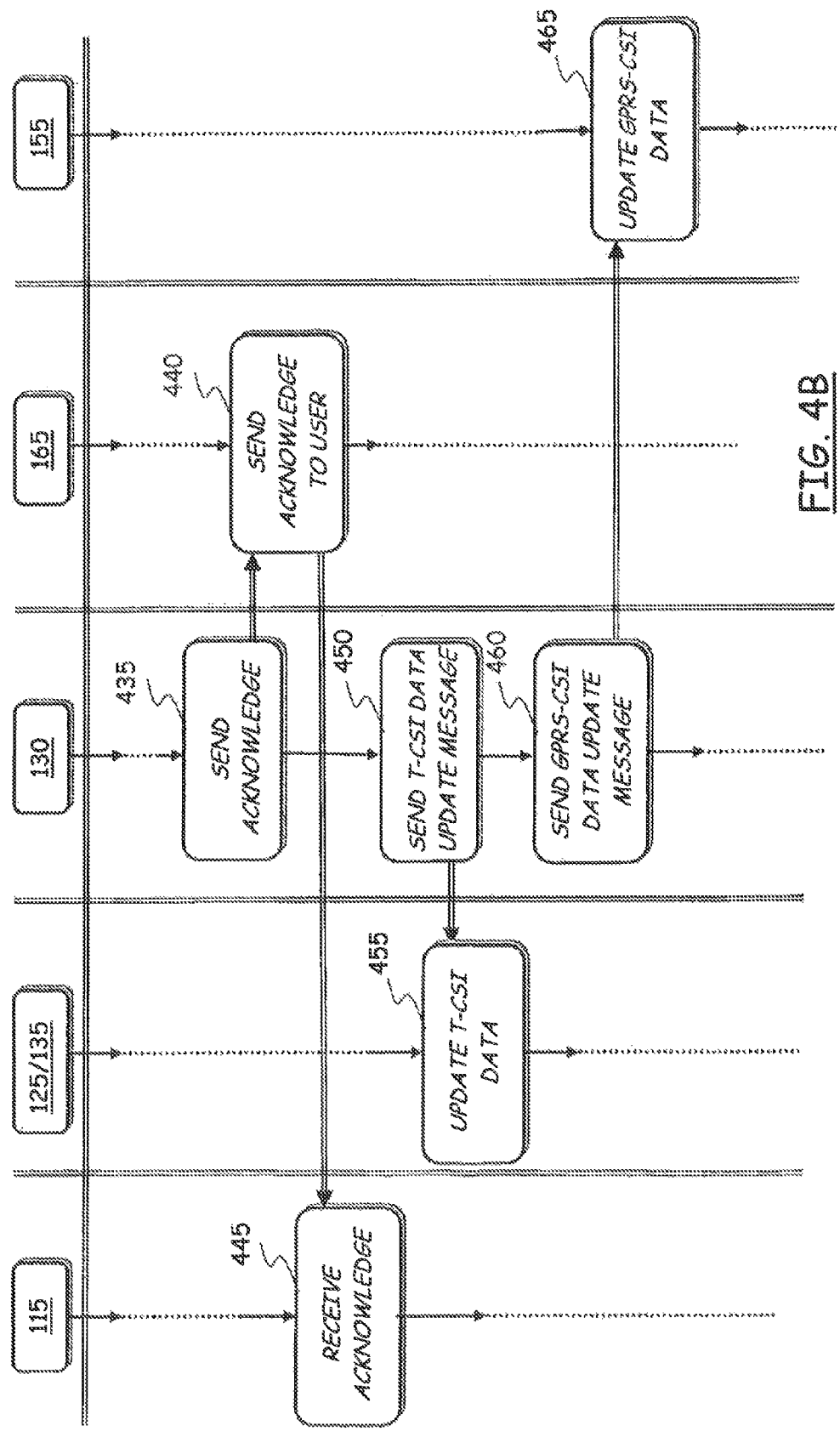

As depicted schematically in FIG. 2, according to the CAMEL standard, particularly to the ph3 thereof, the subscription data of the generic subscriber user USERi stored in the HLR 130 of the user's home network 100 or 100*h*, may include a GPRS-CSI (GPRS Camel Subscription Information) category 205 and a T-CSI (Terminating Camel Subscription Information) category 210.

In particular, the GPRS-CSI category 205 is exploited for managing requests related to PDP contexts activation received by the generic mobile terminal 115. In detail, the GPRS-CSI category includes, possibly among other data, not relevant to the invention embodiment being described, a network address gsmSCF address 215, and a key Service Key 220. The address gsmSCF address 215 is an address (particularly, in E.164 format) of a predetermined network entity, namely a Service Control Point (SCP) operating as a Service Control Function (SCF) in respect of the management of requests concerning GPRS sessions, and to which the requests of PDP contexts activation received by the mobile terminal of the user USERi are to be routed. The key Service Key 220 identifies a specific service among all the services implemented by that SCF whose address is gsmSCF address. Roughly speaking, the SCF is a logical network entity that controls the implementation of one or more respective services, and corresponds to an SCP, which instead is a physical network node (in other words, the SCF may be seen as the function implemented by an SCP; for the purposes of the present description, SCF and SCP may be considered synonyms).

The T-CSI category 210 is exploited for managing requests related to circuit-switched (i.e., voice) calls directed to the mobile terminal 115 of the user USERi. In detail, the T-CSI category includes, among possibly other data, not relevant to the invention embodiment being described, a network address gsmSCF address 225, and a key Service Key 230. The address gsmSCF address 225 is an address (particularly, in E.164 format) of a predetermined network SCP implementing an SCF responsible of managing requests related to circuit-switched calls, which is signaled when voice calls are received directed to the mobile terminal 115 of the user USERi. The key Service Key 230 identifies a specific service among all the services implemented by that SCF whose address is gsmSCF address.

According to an embodiment of the present invention, the address gsmSCF address 215 in the GPRS-CSI category 205 and the address gsmSCF address 225 in the T-CSI category 210 for the generic user USERi coincide and correspond to the address of the GSA node 165. The key Service Key 220 and the key Service Key 230 also coincide and correspond to the function, performed by the GSA 165, of managing voice calls and data packets transfers.

Both the GPRS-CSI category 205 and the T-CSI category 210 may be created dynamically, upon receipt from the mobile terminal of the user of the request of enabling reception of voice calls even during data packets transfer, as will be described in detail later on, or they can be static, created for example upon subscription of the user (the user may for example be asked to specify whether he/she wishes that voice calls take priority over GPRS sessions), or at a later time, upon request by the user.

Coming back to FIG. 1, the GSA node 165 is in communication relationship with the MSC 125 (more generally, to the various MSCs of the network 100) and with the SGSN 155 (more generally, to the various SGSNs of the network 100), irrespectively of whether the MSC 125 and the SGSN 155 are assumed to be within the home network of the user of the mobile terminal 115 or within a visited network, thanks to the expedient usage of the CAMEL standard.

Figure 3:
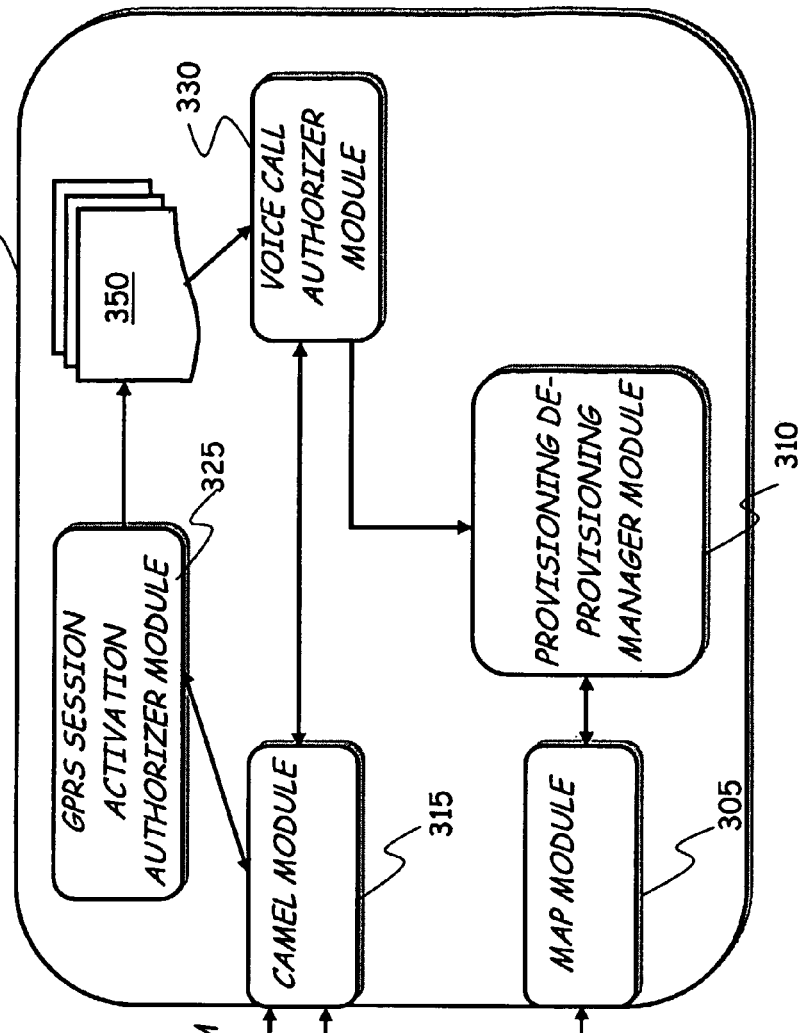
FIG. 3 is a simplified, schematic functional block diagram of a network node, visible in FIG. 1, implementing a call management function, according to an embodiment of the present invention.

FIG. 3 shows in greater detail, in terms of main functional blocks, the structure of the GSA function performed by the GSA node 165, in an embodiment of the present invention.

A MAP module 305 is provided for managing and exchanging MAP (Mobile Application Part) messages with the HLR 130. The MAP module 305 interacts with a provisioning/de-provisioning manager module 310, whose functions are of instructing the HLR 130 in respect of the characterization of the generic user with (i.e., insertion in the profile of that user of) the above-mentioned GPRS-CSI and T-CSI categories. A CAMEL module 315 manages CAMEL phase 3 signaling with the SGSNs, like the SGSN 155; the CAMEL module 315 also manages CAMEL phase 1 signaling with the MSCs, like the MSC 125. In operation, the CAMEL module 315 interacts with a GPRS session activation authorizer module 325, adapted to handle the authorization of the activation of a GPRS session by a user, authorization to be provided to the requesting competent SGSN. The CAMEL module 315 also interacts with a voice call authorizer module 330, adapted to handle the authorization to forward a voice call to the user, authorization to be provided to the requesting competent MSC.

A method according to an embodiment of the present invention will be now described in detail, with the help of the schematic flowcharts of FIGS. 4A-4E.

Normally, at least during a GPRS data packets exchange, the user of the mobile terminal 115, located in the cell 110 and registered at the MSC 125, cannot receive voice calls, for the reasons explained in the foregoing.

Let it be assumed that the user wishes to modify this normal behavior of the network: according to an embodiment of the present invention, the user of the mobile terminal 115 sends a specific message to the home network 100 or 100h, for example a USSD (Unstructured Supplementary Service Data) messages, or the like (as known, USSD is a technology peculiar of the GSM making possible transmission of information via alphanumeric messages—i.e. composed by the characters *, #, numerical and alphabetic—over the GSM signaling channels), for instructing the home network 100 or 100h that he/she wishes to be informed of incoming voice calls even during an exchange of GPRS data packets (block 405). For example, the USSD message may include a predetermined string of characters, recognized by the home network 100 or 100h.

The USSD message is received at the MSC 125 at which the mobile terminal 115 is registered; the USSD string, included the string inputted by the user, is forwarded to the HLR 130 (the HLR of the home network of the user of the mobile terminal 115). In particular, in an embodiment of the present invention, the MSC 125 compiles a MAP (Mobile Application Part) message, particularly a MAP Process USSD message, including, in addition to the string included in the USSD message, an identifier of the user of the mobile terminal 115, like the IMSI (International Mobile Subscriber Identity) and/or the MSISDN (Mobile Station international ISDN number), adapted to uniquely and unambiguously identify the user (block 410).

The HLR 130 receives the MAP Process USSD message and forwards it to the network node 165 that implements the GSA function (block 415); to this purpose, the HLR 130 needs to be properly configured so as to recognize the predetermined string of characters in the MAP Process USSD message and to route the latter to the proper network node.

The message is received at the network node 165 implementing the GSA function, which extracts the user identifier(s) IMSI/MSISDN from the message (block 420), and sends to the HLR 130 a provisioning command (including the user identifier(s) IMSI/MSISDN) instructing the HLR to update the user profile, particularly for assigning to the user the CAMEL categories GPRS-CSI and T-CSI (block 425).

The HLR 130 receives the provisioning command from the network node 165 that implements the GSA function, and updates the user profile, for assigning to the user the CAMEL categories GPRS-CSI and T-CSI (block 430). Preferably, the HLR then sends to the network node 165 that implements the GSA function an acknowledge message (block 435). The network node 165 that implements the GSA function receives the acknowledge from the HLR 130 and preferably acknowledges the user (block 440), for example by sending a MAP message, like a MAP Notify USSD message (which is received by the HLR 130, which sends the USSD string to the MSC 125, the latter sending the USSD message to the mobile terminal 115). The acknowledge is received by the user at the mobile terminal 115 (block 445).

The HLR 130 also compiles and sends a message to the MSC 125 at which the mobile terminal 115 is registered for updating the T-CSI category data of that user (in the VLR 135 associated with the MSC 125) (block 450). For example, the message can be a MAP message, particularly a MAP Update Location message. The MSC 125 receives the MAP Update Location message and updates (in the associated VLR 135) the profile of the user, by adding the T-CSI category data (block 455).

In a similar way, the HLR 130 compiles and sends a message to the competent SGSN 155, being the SGSN responsible of the cell 110 in which the user is located, for updating the GPRS-CSI category data of that user (block 460). For example, the message can be a MAP message, particularly a MAP Update Location message. The SGSN 155 receives the MAP Update Location message and updates the profile of the user, by adding the GPRS-CSI category data (block 465).

In this way, the user of the mobile terminal 115 is enabled to have voice calls forwarded to him/her even in case he/she has a GPRS session active, in the way explained hereinbelow.

The user of the mobile terminal 115 activates a PDP context (block 470), for example for connecting to the Intranet of his/her company, possibly at a later time after having enabled the service as explained above.

Upon receipt of the PDP context activation request, the SGSN 155 looks at the user profile and ascertains that the user is characterized by a GPRS-CSI category. Thus, the SGSN 155 (particularly, a CAMEL gprsSSF functionality thereof, adapted to interfacing with the GSA function, which is a CAMEL gsmSCF), further to setting up the PDP context with the competent GGSN 145, sends a message to the network node 165 that implements the GSA function (whose address is specified by the address GsmSCF address of the GPRS-CSI category) for receiving instructions about how to handle the PDP context activation request, particularly for requesting the authorization to continue with the establishment of the PDP context (block 473).

Figure 5:
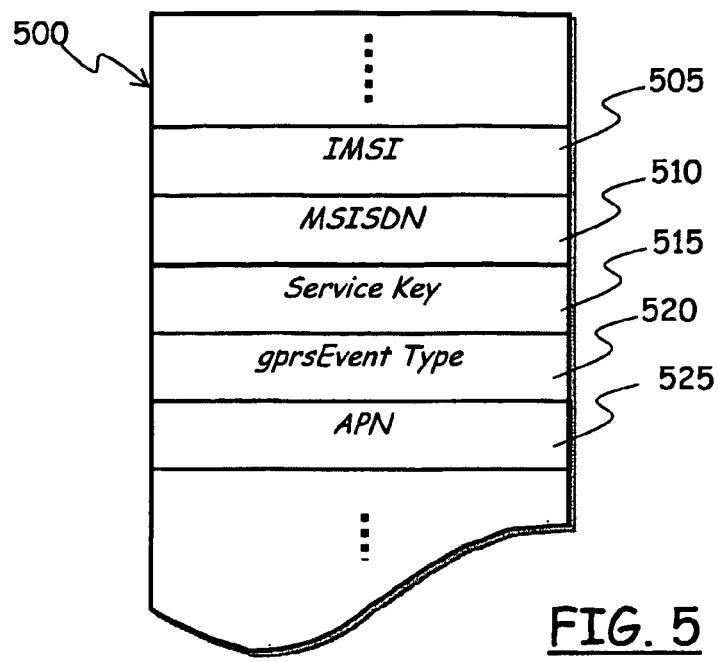
FIG. 5 is a simplified pictorial representation of a CAP (CAMEL Application Protocol) phase 3 (ph3) InitialDPgprs message, in an embodiment of the present invention.

In particular, the message can be a CAP (CAMEL Application Protocol) message, namely a CAP ph3 InitialDPgprs message, whose structure is schematically depicted in FIG. 5 (only a few, relevant fields of the message are schematically shown). The message, globally identified by reference numeral 500, includes an IMSI field 505, an MSISDN field 510, a Service Key field 515, a gprsEvent Type field 520, and an APN field 525. The IMSI field 505 includes the IMSI of the user of the mobile terminal 115; the MSISDN field 510 similarly includes the MSISDN of the user of the mobile terminal 115; the Service Key field 515 identifies the service logic to be used by the gsmSCF, i.e. the logic to be implemented by the GSA function implemented by the network node 165; the gprsEvent Type field 520 specifies that the control relationship between the (gprsSSF functionality of the) SGSN 155 and the GSA function relates to a PDP context activation request received by the user of the mobile terminal 115, the APN field 525 identifies the APN (Access Point Name) invoked by the user of the mobile terminal 115 for activating the PDP context.

The network node 165 that implements the GSA function receives the authorization request, and sends to the SGSN 155 the necessary authorization to continue with the establishment of the PDP context (block 475), for example by sending a CAP ph3 Continuegprs message. The SGSN 155 sets up the PDP context as provided in the GPRS standard, by sending a PDP context create request to the GGSN 145 (block 477).

When the PDP context has been activated (block 479), the user of the mobile terminal 115 connects to the packet data network 140, and thus he/she may surf, browse Web pages, access his/her mailbox, download files (block 481).

The network node 165 that implements the GSA function creates a dynamic record (schematically depicted in FIG. 3 and denoted as 350) in respect of the user of the mobile terminal 115, including (at least) the user identifier(s) IMSI/MSISDN, and a flag identifying that a PDP context is currently active in respect of that user (block 483).

Let it be assumed that, at a given time, while the user is engaged in a GPRS session (i.e., while the PDP context is active), someone places a voice call directed to the user of the mobile terminal 115. The call is received at the MSC 125 at which the user is currently registered (block 485).

Upon receipt of the call, the MSC 125 looks at the user profile in the VLR 135 and ascertains that the user is characterized by a T-CSI category. Thus, the MSC 125 (particularly, a CAMEL gsmSSF functionality thereof, adapted to interfacing with the GSA function), before trying to route the call to the mobile terminal 115, sends a message to the network node 165 that implements the GSA function (whose address is specified by the address GsmSCF address of the T-CSI category) for receiving instructions about how to handle the call (block 487).

Figure 6:
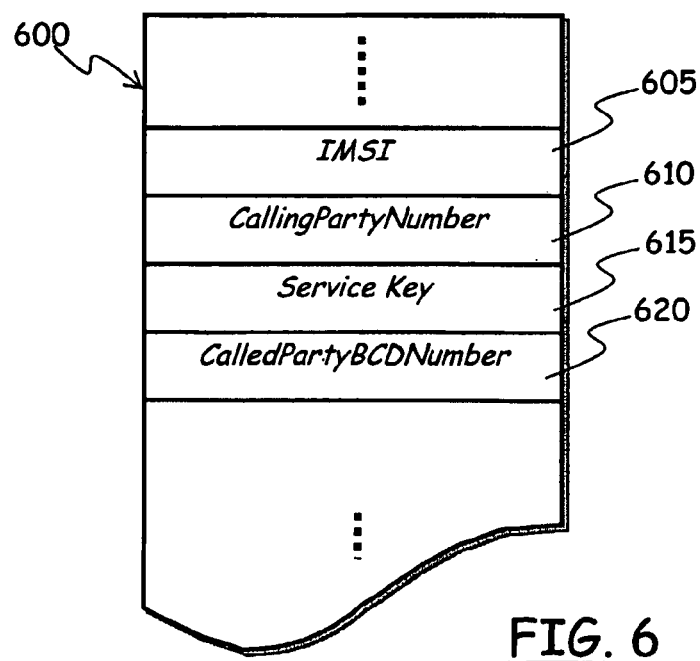
FIG. 6 is a simplified pictorial representation of a CAP (CAMEL Application Protocol) phase 1 (ph1) InitialDP message, in an embodiment of the present invention.

In particular, the message can be a CAP message, namely a CAP InitialDP message, whose structure is schematically depicted in FIG. 6 (only a few, relevant fields of the message are schematically shown). The message, globally identified by reference numeral 600, includes an IMSI field 605, a CallingPartyNumber field 610, a Service Key field 615, and a CalledPartyBCDNumber field 520. The IMSI field 605 includes the user of the mobile terminal 115; the CallingPartyNumber field 610 is the MSISDN of the calling user, i.e. of the user who called the mobile terminal 115; the Service Key field 615 identifies the service logic to be used by the gsmSCF, i.e. the logic to be implemented by the GSA function implemented by the network node 165 (it is taken from the T-CSI data); the CalledPartyBCDBNumber field 620 specifies the telephone number selected by the calling user.

The network node 165 that implements the GSA function, looking at the dynamic record, ascertains whether the user of the mobile terminal 115 is actively engaged in a GPRS session (block 489), and consequently sends to the SGSN 155 a command for releasing the ongoing GPRS session (block 490); in particular, the network node 165 that implements the GSA function sends to the SGSN 155 a CAP ph3 Releasegprs message.

The SGSN 155 drops the GPRS session by de-activating the PDP context (block 491), and sends an acknowledge message to the network node 165 that implements the GSA function (block 492).

The network node 165 that implements the GSA function then sends to the MSC 125 a CAP Continue message, by which it instructs the MSC to go on with the attempt to place the call to the mobile terminal 115 (block 493). By means of conventional signaling, the MSC 125 informs the mobile terminal 155 of the incoming call (blocks 494 and 495); the user of the mobile terminal 115 may as usual decide whether to accept the call or reject it.

Either in case the user rejects the call, or when the user, after answering it, terminates the call, the MSC 125 notifies the network node 165 that implements the GSA function; the latter preferably causes the mobile terminal 155 to re-activate the GPRS session, by re-activating a PDP context. In particular, and just by way of example, the network node 165 that implements the GSA function may (exploiting a short messaging service of the network) send a short message to the mobile terminal 155; the latter, upon receipt of the short message, may be adapted to automatically start the procedure for re-activate a PDP context (for example, this may be managed by a specific application running on the mobile terminal).

Then, preferred embodiments may provide that the network node 165 implementing the GSA function sends to the HLR 130 a de-provisioning command (including the user identifier(s) IMSI/MSISDN) for updating the user profile, particularly for deleting to the user the CAMEL categories GPRS-CSI and T-CSI (block 496).

The HLR 130 receives the provisioning command from the network node 165 that implements the GSA function, and updates the user profile, for deleting the CAMEL categories GPRS-CSI and T-CSI (block 497). The HLR may send to the network node 165 that implements the GSA function an acknowledge message.

The HLR 130 also compiles and sends a message to the MSC 125 at which the mobile terminal 115 is registered for updating (deleting) the T-CSI category data of that user (in the VLR 135 associated with the MSC 125) (block 498). The MSC 125 receives the message and updates the profile of the user, by deleting the T-CSI category data (block 499). In a similar way, the HLR 130 compiles and sends a message to the competent SGSN 155, for updating (deleting) the GPRS-CSI category data of that user (block 4101). The SGSN 155 receives the message and updates the profile of the user, by deleting the GPRS-CSI category data (block 4103).

Alternatively, the network node 165 implementing the GSA function does not cause the user de-provisioning on its own: the de-provisioning may for example be achieved by having the user send a de-provisioning request, for example via a USSD message. It may be provided that a de-provisioning request is sent from the mobile terminal 115 if the user closes the GPRS session, i.e. if the user closes the PDP context.

If instead, upon receipt of the request of instructions from the MSC, the network node 165 implementing the GSA function ascertains that that user has not a GPRS session active (exit branch N of decision block 489), the MSC is instructed to proceed with the call routing without having to preliminary asking the SGSN to drop the GPRS session. The de-provisioning command may in this case not be sent.

The implementation of the method described in the foregoing is rather simple, and has a very limited impact on the existing network architecture. In particular, it is sufficient that a service platform is provided for (in the home network of the user), adapted to perform the GPRS service addressing function. The MSC (and the associated VLR) should support the phase 1 of the CAMEL standard, whereas the SGSN and the HLR should support the phase 3 of the CAMEL standard. The HLR should be configured to route MAP USSD requests to the network node performing the GPRS service addressing function.

As mentioned in the foregoing, the service can be easily offered also when the user roams in a visited network, provided that the MSC (and the associated VLR) of the visited network support the phase 1 of the CAMEL standard, whereas the SGSN and the HLR of the visited network supports the phase 3 of the CAMEL standard, so as to implement gsmSSF and gprsSSF functionalities adapted to interface with the GSA function.

Although the present invention has been disclosed and described by way of some embodiments, it is apparent to those skilled in the art that several modifications to the described embodiments, as well as other embodiments of the present invention are possible without departing from the scope thereof as defined in the appended claims.

For example, instead of an USSD message, a different type of message can be used, For the sake of simplicity, for the purposes of the present description, e.g., a USSD, an SMS, an MMS message. Additionally, it may be provided that an on-going GPRS session is dropped only in case of an incoming call from a caller belonging to a user-defined list of callers.

The invention claimed is:

1. A method of managing circuit-switched calls in a mobile communications system supporting packet-switched data exchange and comprising at least one support node adapted to manage packet-switched sessions, comprising:
providing a call management function responsive to user command within subscription data of a user;
upon request by the user, having the call management function command inclusion in the user's subscription data of terminating customized application for mobile network enhanced logic (CAMEL) subscription information (T-CSI) category data, said T-CSI category data comprising information allowing the mobile switching center to identify the call management function as the CAMEL service control function responsible for management of circuit-switched calls;
upon reception by the mobile communications system of a circuit-switched call for a user of the mobile communications system, and before informing the user about the circuit-switched call, having a mobile switching center interrogate the call management function for receiving instructions about how to proceed with the routing of the circuit-switched call, said call management function being configured as a CAMEL service control function adapted to interact with said mobile switching center;
responsive to the interrogation by the mobile switching center, ascertaining whether the user is engaged in a packet-switched session; and
in the affirmative case, having the call management function instruct the at least one support node to at least temporarily release the packet-switched session prior to informing the user about the circuit-switched call and prior to having the call management function authorize the mobile switching center to proceed with the routing of the circuit-switched call.

2. The method according to claim 1, wherein said call management function is configured as CAMEL service control function adapted to interact with said support node.

3. The method according to claim 1, further comprising:
upon request by the user, having the call management function command the inclusion in the user's subscription data of general packet radio service-customized application for mobile network enhanced logic subscription information (GPRS-CSI) category data, said GPRS-CSI category data comprising information allowing the support node to identify the call management function as the CAMEL service control function responsible for management of packet-switched sessions.

4. The method according to claim 3, further comprising:
after instructing the support node to at least temporarily release the packet-switched session, having the call management function command deletion from the user's subscription data of said GPRS-CSI category data and T-CSI category data.

5. The method according to claim 1, further comprising:
upon receipt of a request of activation of a packet-switched session, having the support node ask for an authorization by the call management function.

6. The method according to claim 5, further comprising:
upon receipt of a request of authorization by the support node, having the call management function record information adapted to indicate that the user is engaged in a packet-switched session.

7. The method according to claim 6, wherein said ascertaining whether the user is engaged in a packet-switched session is performed based on recorded information.

8. The method according to claim 1, further comprising routing said circuit-switched call after the releasing of said packet-switched session.

9. The method according to claim 8, further comprising causing the packet-switched session to be resumed after said circuit-switched call is ended.

10. An apparatus for use in a mobile communications network comprising at least one support node adapted to manage packet-switched sessions, the apparatus comprising:
a first module adapted to:
upon reception by the mobile communications network of an incoming circuit-switched call for a user of the mobile communications network, and before informing the user about the circuit-switched call, have a mobile switching center interrogate a call management function responsive to user command for receiving instructions about how to proceed with the routing of the circuit-switched call, wherein said apparatus is configured as a customized application for mobile network enhanced logic (CAMEL) service control function adapted to interact with said mobile switching center;
responsive to the interrogation by the mobile switching center, ascertain whether the user is engaged in a packet-switched session;
in the affirmative case, send a first command for at least temporarily releasing the packet-switched session prior to informing the user about the circuit-switched call;
receive from said support node an acknowledgement of the releasing of the packet-switched session; and
send a second command to said mobile switching center after reception of said acknowledgement from said support node, the second command authorizing the mobile switching center to proceed with the routing of the call; and
a second module cooperating with said first module, the second module being adapted to interact with a home location register of said mobile communications network, wherein said second module is further adapted to:
receive a predetermined message originated by said user; and
upon reception of said predetermined message, send a third command to the home location register for the inclusion in user's subscription data of terminating CAMEL subscription information (T-CSI) category data, said T-CSI category data comprising information allowing the mobile switching center to identify the apparatus as the CAMEL service control function responsible for the management of circuit-switched calls.

11. The apparatus according to claim 10, wherein said apparatus is configured as a CAMEL service control function adapted to interact with said support node.

12. The apparatus according to claim 10, wherein said third command is further adapted for the inclusion in user's subscription data of general packet radio service-customized application for mobile network enhanced logic subscription information (GPRS-CSI) category data, said GPRS-CSI category data comprising information allowing the support node to identify the apparatus as the CAMEL service control function responsible for the management of packet-switched sessions.

13. The apparatus according to claim 12, wherein said second module is further adapted to send a fourth command for deleting said GPRS-CSI category data and T-CSI category data from the user's subscription data, after reception of acknowledgement from said support node by the first module.

14. The apparatus according to claim 10, further comprising at least a third module cooperating with said first module, the third module being adapted to record information indicating that said user is engaged in said packet-switched session.

15. The apparatus according to claim 14, wherein said ascertaining whether the user is engaged in a packet-switched session is performed based on recorded information.

16. A mobile communications network comprising a network apparatus and at least one support node adapted to manage packet-switched sessions, comprising:
 a first module adapted to:
  upon reception by the mobile communications network of an incoming circuit-switched call for a user of the mobile communications network, and before informing the user about the circuit-switched call, have a mobile switching center interrogate a call management function responsive to user command for receiving instructions about how to proceed with the routing of the circuit-switched call, wherein said apparatus is configured as a customized application for mobile network enhanced logic (CAMEL) service control function adapted to interact with said mobile switching center;
  responsive to the interrogation by the mobile switching center, ascertain whether the user is engaged in a packet-switched session;
  in the affirmative case, send a first command for at least temporarily releasing the packet-switched session prior to informing the user about the circuit-switched call;
  receive from said support node an acknowledgement of the releasing of the packet-switched session; and
  send a second command to said mobile switching center after reception of said acknowledgement from said support node, the second command authorizing the mobile switching center to proceed with the routing of the call; and
 a second module cooperating with said first module, the second module being adapted to interact with a home location register of said mobile communications network, wherein said second module is further adapted to:
  receive a predetermined message originated by said user; and
  upon reception of said predetermined message, send a third command to the home location register for the inclusion in user's subscription data of terminating CAMEL subscription information (T-CSI) category data, said T-CSI category data comprising information allowing the mobile switching center to identify the apparatus as the CAMEL service control function responsible for the management of circuit-switched calls.

* * * * *